Patented July 7, 1931

1,813,870

UNITED STATES PATENT OFFICE

JULES VERNER, OF LINDEN, NEW JERSEY, ASSIGNOR TO STANDARD OIL DEVELOPMENT COMPANY, A CORPORATION OF DELAWARE

METHOD OF REDUCING EVAPORATION LOSSES IN TANKS

No Drawing. Application filed November 2, 1929, Serial No. 404,516. Renewed May 21, 1931.

This invention relates to a method of decreasing the loss of readily vaporizable constituents stored in tanks; more specifically, it relates to a method in which the evaporation of gasoline and other light liquids is minimized by covering the tank roof and upper shell courses with gypsum or any other similar porous material which is kept wet by spraying with water at certain time intervals. The consequent temperature drop caused by the evaporation of the water from the porous insulation will keep the vapor space at a lower temperature than it would be without such protection. This comparatively lower temperature lessens evaporation of the liquid within the tank.

The invention will be fully understood from the following description:

Gasoline and other readily vaporizable liquids suffer considerable evaporation loss during storage. Such loss is mainly due to daily variations of the temperature. During the cool night and morning hours the air and vapors in the vapor space of the tank contract and the resulting diminution of pressure causes outside air to enter the tank. The opposite phenomenon takes place during the hot noon and afternoon hours when part of the expanded air and vapors leave the tank resulting in the loss of such vapors.

According to this invention, the daily fluctuation of the temperature in the tank's vapor space is minimized and the evaporation loss greatly reduced by applying a layer of porous material to the outside of the tank roof and shell and spraying it at intervals with water. The porous material absorbs the water which evaporates at a slower or faster rate depending on atmospheric conditions and the temperature in the vapor space of the tank is reduced due to the temperature drop of the insulation caused by evaporation of the water.

Any absorptive or porous materials may be used for this purpose, such as gypsum, celite, porous tile, terra cotta, porous concrete, etc. In the preferred embodiment of my invention a 1"–1½" thick layer of gypsum is used. As known to those skilled in the art, the crude gypsum has two varieties: rock gypsum and gypsum earth, or gypsite. These are calcined and made into plasters. The best known is the plaster of Paris which consists of an incompletely dehydrated gypsum and is a white powder having the approximate chemical composition: $CASO_4 + \frac{1}{2}H_2O$. When tempered with sufficient water, say 35% or so, to form a plastic paste, it sets in 5–10 minutes inert. Ingredients such as wood chips may be added to a diluted paste together with small amount of retardants for the setting, such as glue or similar colloids.

Before applying the plaster the tank sheets are to be thoroughly cleaned and then coated with roofing pitch, or similar protection against moisture. The plaster layer is then applied to the sheets. If desired thin wire reinforcement may be used as a base for the plaster. The range of thickness of the gypsum coating may vary considerably although a 1"–1½" thick layer is very effective.

The gysum surface is wetted down by means of water sprays located on the tank with sufficient frequency so that evaporation can take place continuously. The number of sprays applied daily depends on the local atmospheric conditions. Under certain circumstances, one spray a day will be sufficient while in other cases, the protective layer has to be sprayed several times during the day. The outer surface of the gypsum layer is apt to become clogged by dust, etc.; so that the sprayed water does not penetrate deeply enough into the layer and the latter loses its efficiency. The protective layer may again be rejuvenated by scraping its surface with a sharp metal tool or rotary wire brush.

As was pointed out above, the protection of the vapor space of the tank is of the main importance while the covering of the liquid space with a protective layer is of minor importance, although naturally it has beneficial results. An advantage of covering the whole surface of the tank consists in the further protection obtained thereby against fire. The gypsum layer is an excellent insulating material which provides a very thorough protection for a tank in case of fire raging in its vicinity. However, in order to keep down expenses, I prefer to provide a protective layer only on the roof and the upper shell courses of the tank i. e., around the vapor space. In some cases the insulation of the tank roof is sufficient.

The following table gives the temperature differential arrived at during a preliminary test made with one gallon oil cans insulated or painted in the following manner: In each case the entire can was covered and each can was provided with a thermometer on which readings were taken simultaneously at 10-minute intervals for a period of several hours.

1″ thick gypsum insulation, kept wet -- 57°
1″ thick gypsum insulation dry _____ 67°
Insulation composed of 1″ thick hairfelt with a protection of white surfaced asbestos roofing paper, white surface exposed to the exterior _____ 71°
Painted with white paint _____ 69°
Painted with aluminum paint _____ 73°

The invention may be carried out in various other modifications. Instead of applying to the tank shell a plastic paste, it may be covered with pre-cast gypsum slabs obtainable on the market. Such variations are within the scope of the invention, which I do not wish to limit by the particulars given above by way of illustration.

I claim:

1. The method of minimizing the evaporation loss of liquids during storage in tanks, which comprises covering at least part of the outside surface of the tank with a porous material and spraying said material with water often enough to keep it wet, so that evaporation of water can take place continuously, whereby the daily temperature variations inside the tank are reduced.

2. The method according to claim 1, in which only the vapor space above the liquid level is covered with the porous material.

3. The method according to claim 1, in which only the tank roof is covered with the porous material.

4. The method according to claim 1, in which gypsum is applied as a coating.

JULES VERNER.